(12) United States Patent
Menke

(10) Patent No.: US 8,919,599 B2
(45) Date of Patent: Dec. 30, 2014

(54) FUEL TANK

(75) Inventor: Andreas Menke, Tiefenbronn-Lehningen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 6 days.

(21) Appl. No.: 13/183,741

(22) Filed: Jul. 15, 2011

(65) Prior Publication Data

US 2012/0024868 A1    Feb. 2, 2012

(30) Foreign Application Priority Data

Jul. 28, 2010   (DE) .......................... 10 2010 036 683

(51) Int. Cl.
*B65D 1/42* (2006.01)
*B60K 15/03* (2006.01)

(52) U.S. Cl.
CPC ............ *B60K 15/03* (2013.01); *B60K 15/03177* (2013.01); *B60K 2015/03493* (2013.01); *B60K 2015/03032* (2013.01); *B60K 2015/03453* (2013.01)
USPC ............................ 220/653; 220/651; 220/562

(58) Field of Classification Search
USPC ............... 220/651, 653, 4.12–4.14, 562, 563, 220/592, 581; 248/565, 594, 313, 503, 903, 248/562, 566, 584; 280/124.147, 124.155
See application file for complete search history.

(56) References Cited

U.S. PATENT DOCUMENTS

| | | | | |
|---|---|---|---|---|
| 3,368,708 A * | 2/1968 | Pflederer | ....................... | 220/590 |
| 4,673,192 A * | 6/1987 | Krehan et al. | ......... | 280/124.155 |
| 5,131,638 A * | 7/1992 | Hein et al. | .................... | 267/220 |
| 5,538,332 A * | 7/1996 | Carroll | ............................. | 303/28 |
| 5,758,796 A * | 6/1998 | Nishimura et al. | ........... | 220/590 |
| 5,813,566 A * | 9/1998 | Bradford et al. | .............. | 220/653 |
| 6,135,306 A | 10/2000 | Clayton et al. | | |
| 6,138,859 A * | 10/2000 | Aulph et al. | .................. | 220/563 |
| 6,260,835 B1 * | 7/2001 | Angles et al. | ................. | 267/220 |
| 6,338,420 B1 | 1/2002 | Pachciarz et al. | | |
| 6,857,534 B1 * | 2/2005 | Keller | .......................... | 220/4.13 |
| 6,948,728 B2 * | 9/2005 | Pflugner et al. | ......... | 280/124.147 |
| 7,455,190 B2 | 11/2008 | Potter et al. | | |
| 2005/0011891 A1 | 1/2005 | Austerhoff | | |
| 2005/0016600 A1 * | 1/2005 | Knaggs et al. | ................ | 137/590 |
| 2007/0144850 A1 * | 6/2007 | Hattori | ..................... | 188/322.16 |
| 2009/0206097 A1 | 8/2009 | Gebert et al. | | |

FOREIGN PATENT DOCUMENTS

| | | |
|---|---|---|
| DE | 29 31 947 | 2/1981 |
| DE | 10 2008 009 829 | 8/2009 |
| EP | 0 633 422 | 1/1995 |
| GB | 2 236 288 | 4/1991 |
| JP | H0989051 | 3/1997 |
| JP | 2000100283 | 4/2000 |

(Continued)

*Primary Examiner* — Fenn Mathew
*Assistant Examiner* — Robert Stodola
(74) *Attorney, Agent, or Firm* — Gerald E. Hespos; Michael J. Porco; Matthew T. Hespos

(57) ABSTRACT

A fuel tank is provided having a plastic container with a cavity for holding fuel. Inner and outer plates are arranged on opposite wall regions of the plastic container. A reinforcement device is arranged between opposite wall regions of the fuel tank and comprises a tension/compression strut extending through the inner plates, wall regions, and outer plates. Axial securing means are provided on free ends of the tension/compression strut. The reinforcement device further comprises a spring device bearing against the inner plates. The reinforcement device is configured to absorb both compressive forces and tensile forces.

5 Claims, 1 Drawing Sheet

(56) References Cited

FOREIGN PATENT DOCUMENTS

| | | |
|---|---|---|
| JP | 2005162010 | 6/2005 |
| JP | 2010070097 | 4/2010 |
| JP | 2010076526 | 4/2010 |
| JP | 20115950 | 1/2011 |

\* cited by examiner ern Patent Application No. 10 2010 036 683.8 filed on Jul.

FUEL TANK

CROSS REFERENCE TO RELATED APPLICATION

This application claims priority under 35 USC 119 to German Patent Application No. 10 2010 036 683.8 filed on Jul. 28, 2010, the entire disclosure of which is incorporated herein by reference.

BACKGROUND OF THE INVENTION

1. Field of the Invention

The invention relates to a fuel tank having a cavity with a reinforcement device to provide support.

2. Description of the Related Art

Generic fuel tanks are shown in U.S. Pat. Nos. 7,455,190, 6,338,420, 6,135,306, German laid-open patent application DE 10 2008 009 829 A1 and published British patent application GB 2 236 288 A.

The object of the invention is to provide a fuel tank with a reinforcement device that has a high degree of stability and can be manufactured cost-effectively.

SUMMARY OF THE INVENTION

The invention relates to a fuel tank with a cavity and a reinforcement device arranged in the cavity to provide support. The reinforcement device is configured to absorb both compressive forces and tensile forces. The cavity in the fuel tank functions to hold fuel. For operationally conditioned reasons and owing to ambient influences, the pressure in the cavity can change to a greater or lesser extent due to temperature fluctuations. The fuel tank preferably is a pressurized tank made of plastic and is arranged, for example, in a pressurized tank system of a hybrid vehicle. The reinforcement device can significantly improve the stability of the fuel tank both in the case of underpressure and in the case of overpressure in the cavity.

The reinforcement device preferably comprises at least one tension/compression strut arranged between two opposite wall regions of the fuel tank. The tension/compression strut may extend through the two opposite wall regions of the fuel tank.

The tension/compression strut may be clamped in between the two opposite wall regions of the fuel tank with the aid of a spring device. The spring device prestresses the two opposite wall regions away from one another. Thus, a predefined distance between the two wall regions of the fuel tank remains unchanged even in the case of an underpressure in the cavity.

The spring device may comprise at least one compression spring, for example, a helical compression spring. A plurality of compression springs can also be connected in parallel and/or in series.

The spring device may be clamped between two inner plates. The inner plates function to support the spring device and to apply the spring force to the fuel tank over a surface. The inner plates can be formed from the same plastic material as the fuel tank.

The two opposite wall regions of the fuel tank each may be arranged between an inner plate and an outer plate. The inner and outer plates function, inter alia, to protect the fuel tank and can be formed from the same material as the fuel tank or from different materials than the fuel tank.

An axial securing means may be provided at each end of the tension/compression strut. The axial securing means prevents the two opposite wall regions from moving away from one another if an overpressure occurs in the cavity. Tensile forces are applied to the tension/compression strut via the axial securing means.

The two opposite wall regions of the fuel tank may be sealed off on the outside by a lid in a region where the tension/compression strut passes through. The lid preferably is formed from plastic and preferably is connected in a materially joined fashion to the wall regions of the fuel tank.

The tension/compression strut preferably is formed from metal. As a result, a high degree of stability of the fuel tank can be achieved easily.

The fuel tank preferably is a plastic pressurized tank. The plastic pressurized tank may be blow molded.

Further advantages and details of the invention emerge from the following description of an exemplary embodiments are described with respect to the drawings.

DETAILED DESCRIPTION OF THE PREFERRED EMBODIMENTS

Figure 1:
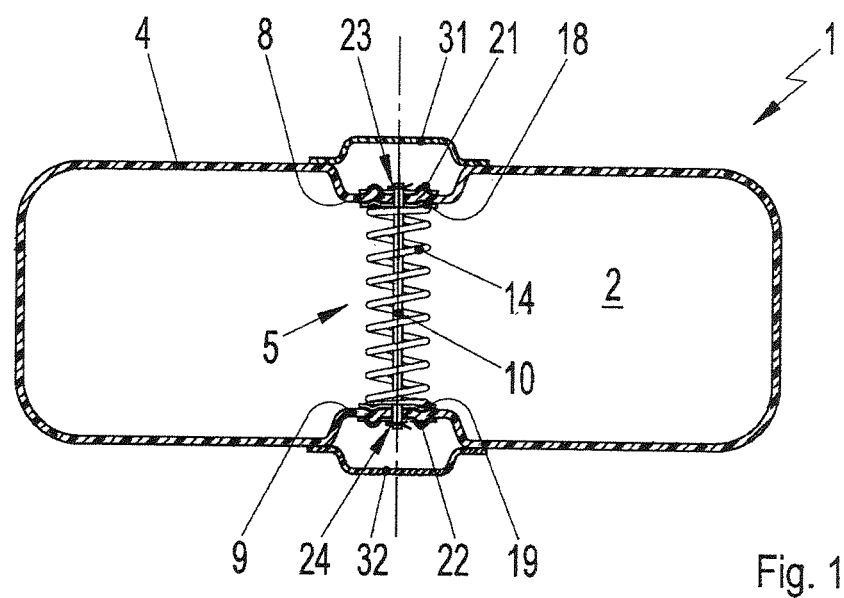
FIG. 1 is a highly simplified illustration of a fuel tank of the invention in section.

FIG. 1 is a highly simplified cross-sectional view of a fuel tank 1 with a cavity 2 for holding fuel. The fuel tank 1 comprises a plastic container 4 with a reinforcement device 5 in the cavity 2. The plastic container 4 preferably is manufactured by blow molding.

The reinforcement device 5 is arranged between two opposite wall regions 8, 9, of the plastic container 4 or fuel tank 1, and comprises a tension/compression strut 10. The tension/compression strut 10 extends through the two wall regions 8, 9 so that the free ends of the tension/compression strut 10 are arranged outside the plastic container 4.

The free ends of the tension/compression strut 10 preferably are arranged in trough-like depressions formed in the wall regions 8, 9 of the fuel tank 1. The wall regions 8, 9 are curved convexly inward to form the depressions.

The reinforcement device 5 also comprises a spring device 14 that is clamped between two inner plates 18, 19 that define spring plates. The inner plate 18 and 19 bear respectively on the insides of the wall regions 8 and 9.

The wall regions 8, 9 each are arranged between the assigned inner plate 18, 19 and a corresponding outer plate 21, 22. The outer plates 21, 22 have essentially the same form as the inner plates 18, 19. The tension/compression strut 10 extends through the inner plates 18, 19, the wall regions 8, 9 and the outer plates 21, 22.

An axial securing means 23, 24, such as a cotter pin, is provided on each of the free ends of the tension/compression strut 10 projecting out of the cavity 2. The axial securing means 23, 24 prevents the wall regions 8, 9 from moving away from one another if an overpressure occurs in the cavity 2 of the fuel tank 1.

The spring device 14, which may be a helical compression spring, is clamped between the two wall regions 8, 9 in such a way that the two wall regions 8, 9 do not move toward one another if an underpressure occurs in the cavity 2 of the fuel tank 1.

The reinforcement device 5 holds the wall regions 8, 9 at a constant distance both in the case of an underpressure and an overpressure in the cavity 2 of the fuel tank 1.

Lids 31, 32 are welded onto the outside of the wall regions 8, 9 to seal off the fuel tank 1. The lids 31, 32 surround the free ends of the tension/compression strut 10 and the regions thereof that pass through the plastic container 4 and the outer plates 21, 22.

Figure 2:
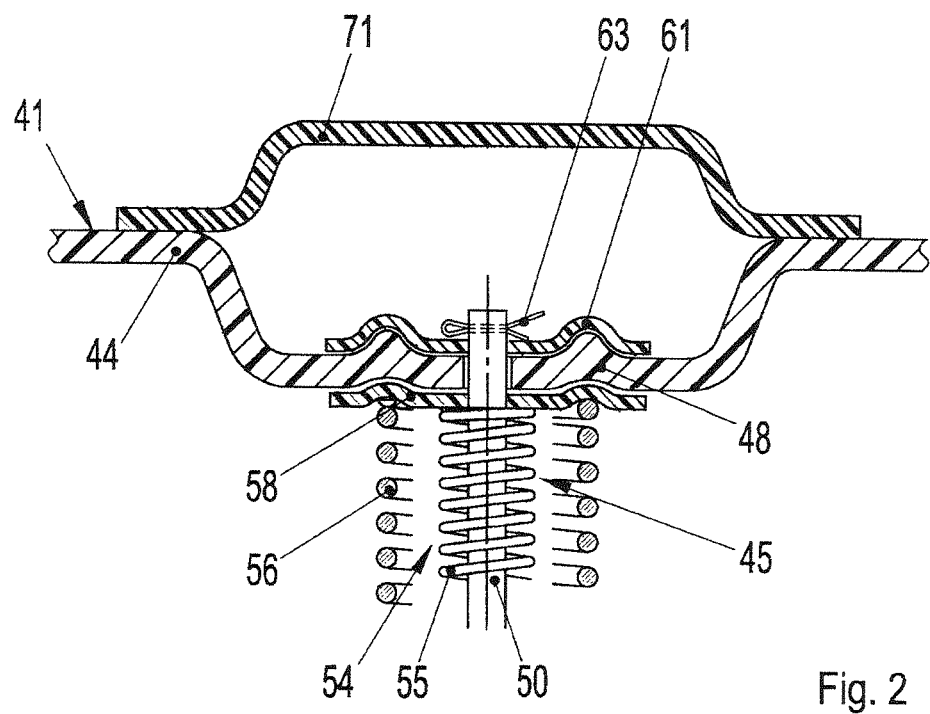
FIG. 2 is a detailed illustration of a detail from FIG. 1 in section.

FIG. 2 illustrates a detail of a fuel tank 41 in section. The fuel tank 41 is embodied, similar to the fuel tank 1 in FIG. 1, as a plastic pressurized tank with a plastic pressurized tank container 44. A reinforcement device 45 is arranged in the fuel tank 41.

One end of the reinforcement device 45 is illustrated in FIG. 2 at a wall region 48 of the plastic pressurized tank container 44. The reinforcement device 45 comprises a tension/compression strut 50 and a spring device 54. The spring device 54 comprises a helical compression spring 55 that is supported on an inner plate 58.

The spring device 54 alternatively or additionally may comprises a second helical compression spring 56 that is prestressed against the inner plate 58. The helical compression spring 55 is arranged inside the helical compression spring 56 and the two helical compression springs 55 and 56 extend around the tension/compression strut 50.

The inner plate 58 defines a spring plate for the spring device 54. The wall region 48 is arranged between the inner plate 58 and an outer plate 61. The end of the tension/compression strut 50 illustrated in FIG. 2 extends out through the inner plate 58, the wall region 48 and the outer plate 61.

An axial securing means 63 is provided at the free end of the tension/compression strut 50. The wall region 48 is clamped, together with the inner and outer plates 58 and 61, between the axial securing means 63 and the spring device 54.

The outwardly projecting free end of the tension/compression strut 50 is arranged, together with the outer plate 61 and the axial securing means 63, in a depression in the plastic container 44. The depression is covered by a lid 71 with a seal-forming effect. The lid 71 preferably is connected in a materially joined fashion, in particular welded, to the plastic container 44.

The plastic container 44, the inner plate 58, the outer plate 61 and/or the lid 71 may be manufactured, for example, from a high density polyethylene. The plastic container 44 preferably is a multiple layer structure. The outer plate 61 advantageously can be prepressed to avoid undesired noises or undesired wear.

The spring device 54 presses the inner plates 18, 19; 58 against the wall regions 8, 9; 48 in the event of an underpressure. As a result, undesired clattering noises are prevented. Maintaining the defined distance between the wall regions 8, 9; 48 prevents undesired wear of the plastic container 4; 44 that otherwise could be caused by a relative movement of the wall regions 8, 9; 48. The lids 31, 32; 71 prevent undesired leakage.

The reinforcement device 5, 45 does not significantly or adversely affect the ability of the plastic container 4; 44 to deform in the case of an accident.

What is claimed is:

1. A fuel tank assembly, comprising:
   a container made of plastic and having first and second non-planar wall regions opposed to one another and deformed inwardly into the container to define first and second outwardly facing concavities, the first non-planar wall region being formed with first non-planar inner surface regions and first non-planar outer surface regions opposite the respective first non-planar inner surface regions, the second non-planar wall region being formed with second non-planar inner surface regions and second non-planar outer surface regions opposite the respective second non-planar inner surface regions, a fuel-receiving cavity between the wall regions, a first opening formed in the first wall region at a position between the first non-planar inner surface regions and a second opening formed in the second wall region at a position between the second non-planar inner surface regions;
   first and second inner plates having non-planar outwardly facing surface regions nested in bearing surface contact on the non-planar inner surface regions of the respective first and second wall regions facing into the cavity, the first and second inner plates having openings registered with the openings in the respective first and second wall regions;
   first and second outer plates disposed respectively in the first and second concavities and having non-planar inwardly facing surface regions nested in bearing surface contact on the non-planar outer surface regions of the respective first and second wall regions facing away from the cavity, the first and second outer plates having openings registered with the openings in the respective first and second wall regions;
   a tension/compression strut having a first end region passing through the openings in the first inner plate, the first wall region and the first outer plate and being secured in the first concavity outwardly of the first outer plate, the tension/compression strut further having a second end region passing through the openings in the second inner plate, the second wall region and the second outer plate and being secured in the second concavity outwardly of the second outer plate;
   at least one compression spring having first and second ends bearing respectively against the first and second inner plates; and
   first and second lids made from plastic and materially joined to outer surface areas of the first and second wall regions outward of the respective first and second concavities for sealing the openings, whereby the tension/compression strut, the compression spring and the inner and outer plates cooperate to absorb both compressive forces and tensile forces.

2. The fuel tank assembly of claim 1, wherein the tension/compression strut is formed from metal.

3. The fuel tank assembly of claim 1, wherein the first and second lids are secured to outer surface areas of the first and second wall regions by welding.

4. The fuel tank assembly of claim 1, wherein non-planar outwardly facing surface regions of the first and second inner plates are convex, and the first and second inner plates further have non-planar concave inwardly facing surface regions opposite the non-planar outwardly facing surface regions, the first and second ends of the compression spring being engaged in the non-planar outwardly facing surface regions of the first and second inner plates.

5. The fuel tank assembly of claim 1, wherein non-planar outwardly facing surface regions of the first and second outer plates are convex, and the first and second ends of the tension/compression strut are disposed between the convex non-planar outwardly facing surface regions of the first and second outer plates.

* * * * *